Figure 1:
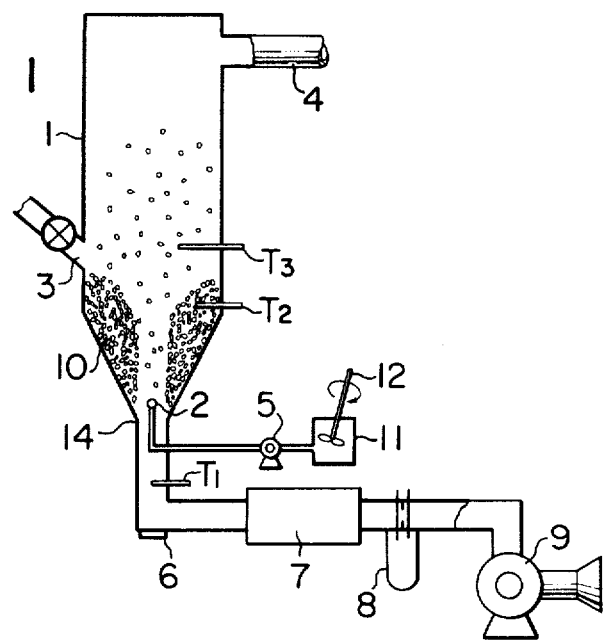

United States Patent [19]
Fujita et al.

[11] 4,369,055
[45] Jan. 18, 1983

[54] COATED GRANULAR FERTILIZER CAPABLE OF CONTROLLING THE EFFECT OF TEMPERATURE UPON DISSOLUTION-OUT RATE

[75] Inventors: Toshio Fujita; Chigo Takahashi; Shigemitsu Yoshida, all of Fujishi, Japan; Hirozo Shimizu, deceased, late of Iseharashi, Japan, by Fumiko Shimizu, executrix

[73] Assignee: Chissoasahi Fertilizer Co., Ltd., Tokyo, Japan

[21] Appl. No.: 299,203

[22] Filed: Sep. 3, 1981

Related U.S. Application Data

[63] Continuation of Ser. No. 108,572, Dec. 31, 1979, abandoned, which is a continuation of Ser. No. 931,428, Aug. 7, 1978, abandoned.

[30] Foreign Application Priority Data

Jan. 9, 1978 [JP] Japan .................................. 53/980

[51] Int. Cl.³ .................................................. C05C 5/02
[52] U.S. Cl. ........................................ 71/64.11; 71/27; 71/63
[58] Field of Search ................. 71/27, 63, 28, 64.11, 71/64.12, 64.13; 428/403, 407.1, 407.2, 407.3; 427/216, 220, 221, 212, 213

[56] References Cited

U.S. PATENT DOCUMENTS

| | | | |
|---|---|---|---|
| 3,372,019 | 3/1968 | Fox | 71/64 |
| 4,015,970 | 4/1977 | Hennart | 71/27 |
| 4,019,890 | 4/1977 | Fujita et al. | 71/64 |

Primary Examiner—S. Leon Bashore, Jr.
Assistant Examiner—Michael L. Goldman
Attorney, Agent, or Firm—Armstrong, Nikaido, Marmelstein & Kubovcik

[57] ABSTRACT

Fertilizers coated with coating layer having a controlled moisture permeability and a controlled temperature dependency of moisture permeability are presented by the production method which comprises ejecting hot drying air to the spout of granular fertilizer and spraying a hot solution of polyolefin type resin, ethylene-vinyl acetate copolymer or vinylidene type resin upon said fertilizer granules and drying said fertilizer granules upon being sprayed with solution having the property capable of forming a solution while it is hot but turning into jelly-like gel when it is cooled but as a most characteristic feature of this method uniformly dispersed fine powder is incorporated in said drying air or in said solution so as to have a coated layer of said resin containing uniformly distributed fine powder.

1 Claim, 4 Drawing Figures

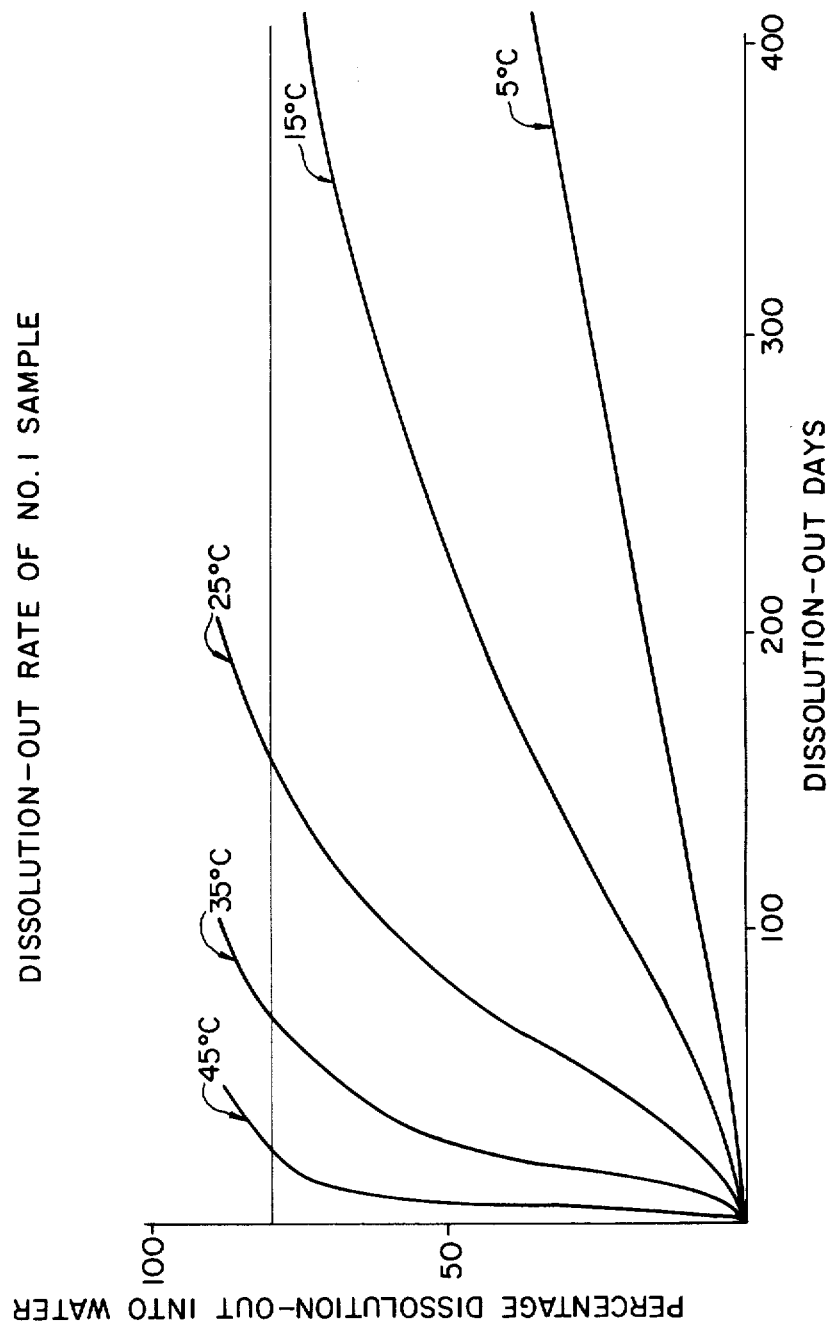

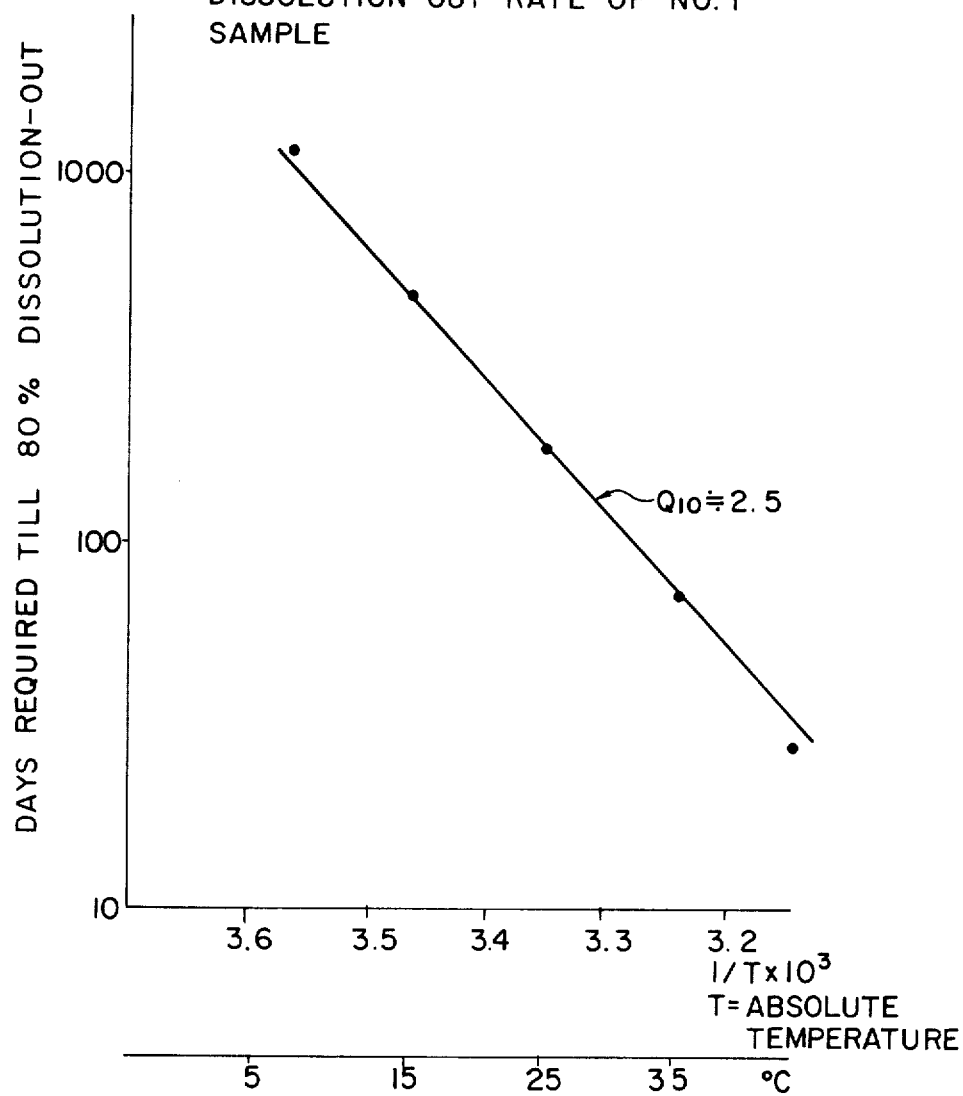

COATED GRANULAR FERTILIZER CAPABLE OF CONTROLLING THE EFFECT OF TEMPERATURE UPON DISSOLUTION-OUT RATE

This is a continuation of application Ser. No. 108,572, filed Dec. 31, 1979 now abandoned which is a continuation of Ser. No. 931,428, Aug. 7, 1978, now abandoned.

BACKGROUND OF THE INVENTION

This invention relates to coated granular fertilizers and a method for producing same. More particularly, this invention relates to granular fertilizers coated with a resin coating layer in which fine powder is uniformly distributed and by which influence of temperature upon the dissolution-out of fertilizer component is controlled and also relates to a method for producing same.

Concomitant with modernization of agriculture, there has been arising a demand of fertilizer having various functions. Among them coated granular fertilizers, as a type of fertilizer capable of controlling dissolution-out of fertilizer component so as to be able to feed nutritious matter required by plants over the entire range of its growing period only by one time application of fertilizer have been drawing general attention. As fertilizers of this kind, those coated with sulfur, wax, and resins have become commercialized. We developed a method for controlling freely the dissolution-out rate of fertilizer by completely coating with a polyolefin and controlling the moisture permeability of the coating and disclosed it in U.S. Pat. No. 4,019,890. The dissolution-out of component from these fertilizers, particularly from those coated with a resin shows preset effectiveness as fertilizer without receiving the influence of field condition e.g. kind of soil, water content, pH, and microorganisms but on the other hand, it is liable to receive a great deal of influence of temperature. This property accords with absorption of nutritious matters by plants and in this regard, is preferable in some cases but in most of the cases, it is preferable to weaken such an influence. Thus, the advent of fertilizers which show much less tendency of receiving influence of temperature in the dissolution-out of fertilizer component has been desired.

Accordingly, it is an object of the present invention to provide a fertilizer coated with a coating layer having a controlled moisture permeability and a controlled temperature dependency of the moisture permeability.

It is another object of the present invention to provide a method for producing such a fertilizer.

SUMMARY OF THE INVENTION

The invention lies in granular fertilizers coated with a coating layer comprising, as a major ingredient of resin portion, polyolefin type resin, ethylene vinyl acetate copolymer, or polyvinyliden type resin and uniformly dispersed fine powder in an amount of from 40 to 80% by weight based upon the coated layer by which the influence of dissolution-out rate of fertilizer component by temperature is set to a controlled value.

The invention lies also in one aspect in a method for producing granular fertilizers coated with a coating layer in which fine powder is uniformly dispersed, said method comprising ejecting hot drying air to the spout of granular fertilizer and spraying a hot solution of polyolefin type resin, ethylene-vinyl acetate copolymer or vinylidene type resin upon fertilizer granules and drying said fertilizer granules upon being sprayed with solution immediately on the spot with hot dry air, said solution having the property capable of forming a solution while it is hot but turning into jelly-like gel when it is cooled and said solution containing uniformly dispersed fine powder incorporated therein.

The invention lies also in another aspect in a method for producing granular fertilizers coated with a coating layer in which fine powder is uniformly dispersed which comprises ejecting hot drying air containing uniformely dispersed fine powder to the spout of granular fertilizer and spraying a hot solution of polyolefin type resin, ethylene-vinyl acetate copolymer or vinylidene type resin upon fertilizer granules, and drying said fertilizer granules upon being sprayed with solution immediately on the spot with hot dry air; said solution having the property capable of forming a solution while it is hot but turning into jelly-like gel when it is cooled.

DESCRIPTION OF THE INVENTION

The dissolution-out of fertilizer component from granular fertilizer completely coated with resin film of controlled moisture permeability is carried out according to following steps. Coated granular fertilizers applied as a fertilizer, absorb moisture of soil through coated film by the difference of water vapour pressure, the inside fertilizers absorb the moisture, showing deliquescence and one part thereof is dissolved to form a solution. By taking a large amount of moisture into the inside, inside pressure i.e. osmotic pressure is raised. In addition to the stress brought about by this osmotic pressure, action of pin-hole forming agent (such as a surfactant of a suitable molecular weight) creates discharge holes of salts. The dissolution-out of inside fertilizer component is partly carried out by way of concentration diffusion but mostly by way of dissolving into the moving water which enters the inside through the coated film and flows out of the discharge holes. Accordingly, what is most influential to the dissolution-out rate is permeation amount of water vapour and the reason why the dissolution-out of coated granular fertilizer is greatly influenced by temperature lies in this point because the increase of temperature increases the difference of water vapour pressure between the outside and the inside of the resin capsule exponentially and the increase of temperature further increases the moisture permeability of the coated film itself. These two effects are combined to increase the moisture permeability of the resin capsule to a very large extent.

We started the work for the present invention from the concept that if temperature dependency of water-vapour permeability is controllable, the influence of temperature upon the dissolution-out of coated granular fertilizers is also controllable and completed the work by the discovery that if from 40 to 80% by weight of inorganic fine powder is uniformly dispersed in the resin layer in the production method of coated granular fertilizers obtained by the instantaneous drying of fertilizer granules formed by using a solution of a resin such as polyolefin type resin, ethylene-vinyl acetate copolymer or vinylidene type resin, there are formed voids between the resin and the fine powder and temperature dependency of dissolution-out from coated granular fertilizers can be controlled by the amount of the inorganic fine powder. Namely the formation of voids varies depending upon the amount of addition of fine powder. If the amount is less than 30% by weight, voids are not formed. In the range of 40% by weight or more, the amount of voids increases with the increase of the amount of addition. The exact reason of the void formation is not always clear but is believed to be due to the following reason. Firstly, the resin solution used in the present invention is different from the general idea of solution. It shows a solution form while it is hot, but separates finely divided resin component when it is cooled and as a whole forms jelly-like gel in which resin component is uniformly distributed. Thus, if the condition of instantaneous drying of resin solution from the fertilizer granules is not satisfied, uniform coating film is not formed. In this regard, the resin solution of the present invention is special material which does not show stickiness at the time of film forming and does not cause caking as is disclosed in U.S. Pat. No. 4,019,890. Thus it is believed to be under the condition at this time that the adhesiveness to foreign substance e.g. fine particles is extremely weak and easily detachable. Secondly, unlike the condition of an extruder in which mixing and milling is carried out, at the time of film forming, no mechanical compressive force acts and contraction of resin occurs during the coating operation and subsequent temperature condition of treatment, shrinkage of resin occurs and contributes to the formation of voids.

The existence of voids in capsules which are the coating of granular fertilizers or non-existence thereof or the extent of voids present can be easily known by measuring their specific gravities. If no voids are formed, the specific gravity of the capsule coincides with the values calculated from the mixing ratio of mixed fine powder and resin and if voids are formed, the specific gravity becomes smaller. For example if a resin having a specific gravity of 0.935 g/cc is mixed with a fine powder having a specific gravity of 2.8 g/cc in a ratio of 1:1, the calculated value can be obtained as follows. Namely, if the amount of resin is 0.5 g, then the amount of fine powder will be 0.5 g and the total amount of mixture will be 1.0 g and the volume of the mixture will be $$\frac{0.5}{0.935} + \frac{0.5}{2.8}.$$

Accordingly, the specific gravity of the mixture will be $$\frac{1}{\frac{0.5}{0.935} + \frac{0.5}{2.8}}.$$

In general, if weight ratio of fine powder included in the capsule is x (and hence that of resin is $1-x$), then the volume ratio of fine powder y will be $$y = \frac{\rho_P}{\rho_R - \rho_P + \frac{\rho_P}{x}}.$$

The calculated value of specific gravity $\rho_1$ of the capsule can be expressed by the formula $$\rho_1 = \rho_R \cdot \rho_P / \{\rho_P - x(\rho_P - \rho_R)\}$$

wherein $\rho_R$ is the specific gravity of the resin and $\rho_P$ is the specific gravity of a fine powder.

The measured value $\rho_2$ of specific gravity of the capsule of the present invention can be obtained by putting the capsule into various kinds of liquids of known specific gravities and from the value of the liquid in which the capsule does not show falling nor floating. The presence or non-presence of voids in the capsules can be easily known by comparing the values of $\rho_1$ and $\rho_2$ because $\rho_1 > \rho_2$ if there are voids. Further the extent of voids can be obtained from the difference of $\rho_1$ and $\rho_2$ and volume ratio of the resin and fine powder. If the ratio of fine powder increases, the amount of voids also increases and the dissolution-out becomes less susceptible to the influence of temperature. For example if a resin alone or a resin and fine powder in an amount of 30% or less are used, $\rho_1 = \rho_2$ and since no voids are formed the temperature dependency of dissolution-out rate is almost same. In this case, dissolution-out will become about 2.5 times by the increase of temperature of every 10° C. If fine powder is mixed to give the maximum amount of 80% by weight, the dissolution-out will become about 1.9 times and the influence of temperature will show minimum value. Thus in the above-mentioned range of values it is possible to control the dissolution-out rate.

Further by the addition of fine powder, the property of capsule will considerably be changed. Firstly the strength of capsule shows tendency of remarkable reduction. For example if a fine powder such as talc or the like is added as a filler to a polyolefin resin and a film is prepared from a melt in an extruder, the strength does not show change almost at all in case of about 50% by weight addition but in case of the present invention, the strength is reduced to about 1/5. This is due to the fact that in case of ordinary molding, fine powder and resin are adhered to each other very firmly but in case of the product of the present invention, there are formed a great number of voids. This is a very preferable property because remaining capsule after being used is liable to collapse and can be reduced to soil. Secondly, in case of addition of fine powder there is a tendency that the greater the mixed amount is, the faster the dissolution-out rate, though there is a certain extent of difference. According to resin if it is diesred to make slower the dissolution-out rate by increasing the mixing amount of fine powder i.e. if it is desired to make smaller the temperature dependency, it is necessary to select a resin alone or a combination of resins having a smaller moisture permeability.

The above-mentioned property is preferable because it enables to obtain fertilizers having various dissolution-out rates and those having various temperature dependencies of dissolution-out by the selection of a combination of fine powder and resin.

The resins used in the present invention as a major component of resin portion include polyolefin type resin, ethylene vinyl acetate polymer and polyvinylidene chloride type resin and combinations of the foregoing members. They are basically those capable of forming solutions while they are hot but show jelly-like form when they are cooled as disclosed in U.S. Pat. No. 4,019,890. When they are fed on the surface of granular fertilizer and dried instantaneously, they are encapsulated.

As polyolefins type resin useful in the present invention, polyethylene, polypropylene and ethylene-propylene copolymer can be mentioned. Besides, a copolymer of olefin and other vinyl monomer such as ethylene-vinyl acetate copolymer various copolymers of vinylidene chloride and vinyl chloride can be used in the present invention so long as a resin has the above-mentioned property.

As other resins capable of being used as a minor component in the resin portion of the present invention together with the above-mentioned major component, polystyrene and various waxes can be mentioned. They are used so long as resulting mixture shows the above-mentioned property i.e. a solution is formed while it is hot but turned into jelly form when cooled. The limit of the amount of other resin is at the highest 50% by weight.

Fine powders useful in the present invention are basically those which form voids in the inside of the coating layer. The usefulness can be easily known by measuring indirectly voids. Preferable fine powders are inorganic fine powder such as talc, silica, metal oxide such as $Al_2O_3$, $CaO$, $Mgo$, $Fe_2O_3$ and the like and calcium carbonate and the like. Most preferable is talc because of its easily dispersible property. As for particle size, a range from $0.01\mu$ to $40\mu$, preferably a range of from $0.1\mu$ to $20\mu$ is suitable. When particle size is larger than the above-mentioned range, there is disadvantage because the convex parts cannot be covered by the film of resin portion and for complete coating, a thicker coating film must be made. When particle size is less than $0.01\mu$, the effectiveness of the present invention cannot be expected.

There are two kinds of methods useful in obtaining the granular fertilizers of the present invention in which fine powder is uniformly dispersed in a coated layer.

A first method comprises ejecting hot drying air to the spout of granular fertilizer and spraying a hot solution of polyolefin type resin, ethylene-vinyl acetate copolymer or vinylidene type resin upon fertilizer granules, and drying said fertilizer granules upon being sprayed with said solution immediately on the spot with hot dry air; said solution having the property capable of forming a solution while it is hot but turning into jelly-like gel when it is cooled and said solution containing uniformly dispersed fine powder incorporated therein. A resin solution containing uniformly dispersed fine particles are subjected to the operation same with the operation used for handling ordinary resin solutions except that there are limitations in kind and size of particles and the necessity of maintaining uniformity of dispersion state. Namely, it is necessary to continue stirring operation at the time of feeding a solution in order to maintain the uniformity of dispersion state.

In this case preferable fine powder is talc having a particle size less than $20\mu$.

A second method comprises ejecting hot drying air containing uniformly dispersed fine powder, to the spout of granular fertilizer and spraying a hot solution of polyolefin type resin, ethylene-vinyl acetate copolymer or vinylidene type resin upon fertilizer granules and drying said fertilizer granules upon being sprayed with solution immediately on the spot with hot dry air, said solution having the property capable of forming a solution while it is hot but turning into jelly-like gel when it is cooled.

The second method has been developed from the necessary of feeding a solution and fine powder separately and thus it is suitable for the use of fine powder which is not easily dispersed in a solution.

As a method for dispersing fine powder in a coated layer by feeding a coating solution and fine powder there has been known a method in which a revolving pan, a drum or the like is used in sprinkling fine particles with an adhesive agent of resin solution to obtain coating effect but since the dispersion of fine powder is not uniform and continuous layer of resin is liable to be broken, the effectiveness of coating cannot be obtained and fertilizers having controlled dissolution-out rate cannot be produced unlike in the method of the present invention.

The dispersion mechanism of fine powder in the coating layer will be described. When air is ejected from an orifice part situated on the bottom of a vessel filled with granular fertilizer, the fertilizer particles are blown upward, forming a so-called spout state. The part of the spout where fertilizer particles are moving upward forms an air column and ejected air is blown through this air column. If a solution of resin is sprayed from a nozzle provided in the orifice part in this state, it hits against the fertilizer particles which have started spouting and coats the latter. If fine powder are maintained in the state dispersed in the spout of air, fine powders are in the state same with spayed liquid drops of the solution of a resin. Some of them adhere to liquid drops before contact with fertilizer particles and another adheres to fertilizer particles wet with the liquid drops and ultimately there is formed fertilizer particles coated with the resin containing dispersed fine powder in the same manner as those obtained by dispersing in a resin solution.

As one reason which makes the method of the present invention useful, it can be mentioned the fact that fine powder adheres almost quantitatively to fertilizers.

In order that caking is prevented at the time of coating operation, the resin solution of the present invention must have a property capable of forming a solution state while it is hot but turning into jelly form when it is cooled.

As for the solvent useful, in preparing the resin solution of the present invention hydrocarbon such as benzene, toluene, xylene, solvent naphtha or the like or chlorinated hydrocarbon such as trichloroethylene, tetrachloroethylene dichloroethane, dichloroethylene or the like which has a boiling point in the range of temperature from 80° C. to 160° C. can be mentioned.

As for the judgement of resin solution, the description of U.S. Pat. No. 4,019,890 is to be incorporated herein (refer to example 1).

The resin solution thus prepared is fed in the state of solution of viscosity of 40 c.p. or less. When a resin solution contains dispersed fine particles such as talc, it is fed in the state of slurry.

Further, it is necessary to maintain the temperature of fertilizer particles in coating operation in the range of 40°-100° C. preferably 50°-70° C. in order to avoid the range in which the surface part of the resin layer does not cause melt-adhesion and to obtain a uniform capsule.

As for the difference of dispersing method of fine powder, both the methods provide almost the same result regardless of whether it is prepared by dispersing in air or in a resin solution.

The amount of fine powder in the coated layer is in the range of 40–80% by weight. If the amount is greater than 80% by weight, there is a tendency of inferior coating effect. Thus it is recommended to be in the range of 75% by weight or the less. If the amount is less than 40% by weight, temperature dependency is same with that of the case of a resin alone i.e. it is impossible to achieve the object of the present invention.

The products of the present invention have improved moisture absorption property and good fluidity and thus most suitable for mechanical applications of fertilizers.

Present invention will be further illustrated by way of specific examples which are not intended to limit the scope of the invention. Further specific examples are described referring to drawings in which FIG. 1 shows a coating apparatus of spouting bed type, used in example 1, FIG. 2 shows a coating apparatus employed in example 2, FIG. 3 shows curves of dissolution-out rate at various temperatures measured for sample of No. 1 of specific example 3 and FIG. 4 shows the relation of the days required till 80% dissolution-out vs. temperatures.

EXAMPLE 1

An example of the preparation method of coated granular fertilizers of the present invention and an example of preparation of samples for proving the effectiveness of the products of the present invention will be described herein below. In this Example, the preparation is carried out while dispersing fine powder in a solution.

Figure 2:
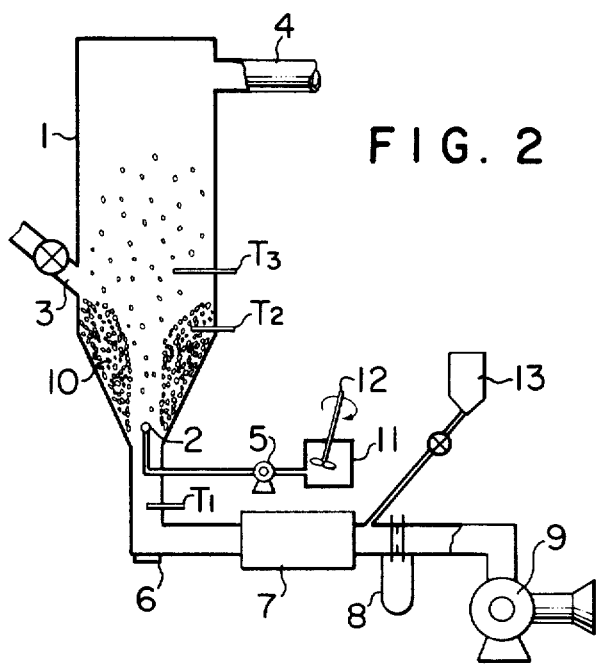

FIG. 1 shows a coating apparatus of spouting bed type employed in this Example. Numeral 1 shows a spouting column having a column diameter of 250 mm, a height of 2,000 mm, a diameter of the part of air spout of 50 mm and a conical angle of 50°. The spouting air is sent below the conical part of the spouting column 14 by way of a blower 9, through an orifice flow meter 8 and a heat exchanger 7. The flow amount of air is adjusted by the orifice flow meter 8 and temperature is adjusted by the heat exchanger 7, and the exhaust air is led through an exhaust air port 4 to the ouside of the column. The granular fertilizer to be subjected to the coating treatment is fed from a feeding port of fertilizer 3 into the column, while passing therethrough hot air under preset conditions, to form a spout. After the temperature of particles 10 in the column has reached 70° C., a coating resin solution is blown into the spout in the form of spray, through a fluid nozzle 2. The resin solution is sent by means of a pump 5 from a solution tank wherein mixing is carried out by means of a stirrer 12, to the nozzle, and a temperature maintaining means is provided so that the temperature of the resin solution does not fall below a preset value. When the percentage coating has reached a definite value, the blower 9 is stopped, and the resulting product is taken out of a discharging port 6. In addition, the hot air temperature, the coated particle temperature and the exhaust air temperature are measured by means of thermometers $T_1$, $T_2$ and $T_3$, respectively.

The basic conditions of this Example are set as follows:

Fluid nozzle: opening ratio 0.8 mm Full cone type
Amount of hot air: 4 m³/min.
Temperature of hot air: 100° C.
Fertilizer employed for this preparation: spherical urea particles (5~7 mesh)
Amount of fertilizer fed: 10 Kg
Amount of solution fed: 0.5 Kg/min.

In addition, the preparation of the solution and its adjustment, in this Example, are carried out as follows:

A solvent (tetrachloroethylene, b.p. 121° C.), a resin, a fine powder, etc. in preset amounts are fed into a dissolving vessel, the temperature of the contents is elevated to 110° C. and dissolution is carried out with stirring to prepare a coating solution. The feeding is carried out always with stirring so that fine powder can be uniformly dispersed. For confirming whether the powder is being uniformly dispersed at the time of feeding or not, a preliminary test for confirming whether the concentration of powder in the solution fed is constant with elapse of time and is maintained at preset value or not, is carried out in advance.

Table 1 shows the preparation conditions of samples prepared in this Example and the percentages dissolution out of the samples after being placed in water at 25° C. for 24 hours as measured. Any of these samples retain the slow-releasing property.

Every one of the samples is cut into halves of the original piece by means of a knife, and the resulting materials, are dried after the urea contained inside thereof has been completely dissolved and packed in a cylindrical filter paper, followed by extracting with tetrachloroethylene as a solvent by means of a Soxhlet extractor, to seek the amount of talc left in the filter paper and the amount of resin obtained by vaporizing the extract to dryness, whereby it is confirmed that the resulting capsule is as formulated.

TABLE 1

| Run No. | Formulation (proportion) of coating materials (by weight) | | | Concentration of solid matters | Feed time of solution | Percentage dissolution-out-into-water after 24 hours |
|---|---|---|---|---|---|---|
| | Resin | Talc | Surfactant | | | |
| 1 | 1.0 | 0.0 | 0.001 | 5 wt % | 20 min. | 1.2% |
| 2 | 0.9 | 0.1 | 0.0009 | " | " | 1.4% |
| 3 | 0.8 | 0.2 | 0.0008 | " | " | 0.8% |
| 4 | 0.7 | 0.3 | 0.0007 | " | " | 1.2% |
| 5 | 0.6 | 0.4 | 0.0006 | " | " | 1.3% |
| 6 | 0.5 | 0.5 | 0.0005 | " | " | 1.2% |
| 7 | 0.4 | 0.6 | 0.0004 | " | " | 1.6% |
| 8 | 0.3 | 0.7 | 0.0003 | " | " | 2.5% |
| 9 | 0.2 | 0.8 | 0.0002 | " | " | 2.8% |
| 10 | 0.1 | 0.9 | 0.0001 | " | " | 10.5% |

*Resin: A mixture of 60% of a low density polyethylene with 40% of an ethylene-vinyl acetate copolymer
*Talc: Particle Size, 1-20, 90% Specific gravity, 2.8 g/cc
*Surfactant: Octaoxyethylene n-nonyl phenyl ether

EXAMPLE 2

In this example coating is carried out while dispersing fine powder in air for drying.

FIG. 2 shows a coating apparatus employed in this Example. The difference from Example 1 consists only in that a fine powder-feeding means 13 is placed in front of the heat exchanger 7, and powder in a preset amount is fed through this means, so that its feed time may accord with that of the coating solution. The reason that the fine powder-feeding means 13 is placed in front of the heat exchanger 7, is to improve the dispersion of fine powder into air by this arrangement and it does not matter where it is located so long as a good dispersion is obtained.

Table 2 shows the preparation conditions employed in this Example and the percentages dissolving-out-into water (25° C.) as measured after 24 hours. Although there are variations in the percentage coating to a certain extent, any of the samples has a function as a slow-releasing fertilizer. Further, the proportion of resin and powder in the capsule prepared according to Example 1 is measured, and it is confirmed that the proportion is as formulated.

specific gravities of capsules, according to the method described hereinbefore.

Table 3 is prepared based upon the results of the measurement. The results of the measurement are recited in the column $p_2$. It is seen that when the ratio of talc (x) exceeds 0.4, the difference between $p_2$ and $p_1$ gradually increases and the ratio of void increases. In addition, the volume ratio of capsule is obtained by calculation as follows. The volume of the combined amounts of resin and talc, per g is $(1/p_1)$ cc, and the ratios are y and 1-y. Further, the void ratio is calculated by $1/p_1 \sim 1/p_2$.

TABLE 3

| | Weight ratio | | Volume ratio | | Specific gravity (g/cc) | | Volume ratio of capsules | | |
| | | | | | Calculated values | Measured values | | | |
| No. | Talc (x) | Resin (1 − x) | Talc (y) | Resin (1 − y) | ($p_1$) | ($p_2$) | Talc | Resin | Void |
|---|---|---|---|---|---|---|---|---|---|
| 1 | 0 | 1.0 | 0 | 1.0 | 0.935 | 0.935 | — | — | — |
| 2 | 0.1 | 0.9 | 0.036 | 0.964 | 1.001 | 1.010 | — | — | — |
| 3 | 0.2 | 0.8 | 0.077 | 0.923 | 1.079 | 1.075 | — | — | — |
| 4 | 0.3 | 0.7 | 0.125 | 0.875 | 1.168 | 1.165 | — | — | — |
| 5 | 0.4 | 0.6 | 0.182 | 0.818 | 1.274 | 1.245 | 0.178 | 0.800 | 0.023 |
| 6 | 0.5 | 0.5 | 0.251 | 0.749 | 1.401 | 1.325 | 0.237 | 0.709 | 0.054 |
| 7 | 0.6 | 0.4 | 0.333 | 0.667 | 1.557 | 1.405 | 0.300 | 0.601 | 0.099 |
| 8 | 0.7 | 0.3 | 0.438 | 0.562 | 1.750 | 1.485 | 0.371 | 0.477 | 0.152 |
| 9 | 0.8 | 0.2 | 0.572 | 0.428 | 2.000 | 1.565 | 0.447 | 0.335 | 0.218 |
| 10 | 0.9 | 0.1 | 0.750 | 0.250 | 2.330 | 1.645 | 0.530 | 0.176 | 0.294 | x: Ratio of raw material talc used (relative to capsule)

y: Value calculated by a formula $\dfrac{p_R}{p_R - p_P + \dfrac{p_P}{x}}$ $p_1$: Value calculated by a formula $\dfrac{p_R \cdot p_P}{p_P - x(p_P - p_R)}$ wherein $p_R$ is a specific gravity of resin (0.0935 g/cc) and $p_P$ is a specific gravity of talc (2.8 g/cc)

TABLE 2

| | Formulation (proportion) of coating materials (by weight) | | | | | Percentage dissolving-out-into-water after 24 hours | | | | | |
| No. | Resin | Fine Powder | Surfactant | Concentration of solution | Feed time of solution and powder | Talc A | Silica | Al₂O₃ | Calcium carbonate | Talc B | Silica B |
|---|---|---|---|---|---|---|---|---|---|---|---|
| 11 | 1.0 | 0.0 | 0.001 | 5.0 wt % | 20 min.* | 1.8 | 1.4 | 0.5 | 1.5 | 1.1 | 1.4 |
| 12 | 0.9 | 0.1 | 0.0009 | 4.5 | " | 1.5 | 1.7 | 1.1 | 2.1 | 1.4 | 1.8 |
| 13 | 0.8 | 0.2 | 0.0008 | 4.0 | " | 1.6 | 1.9 | 1.8 | 1.9 | 1.6 | 2.7 |
| 14 | 0.7 | 0.3 | 0.0007 | 3.5 | " | 1.6 | 1.6 | 2.0 | 3.8 | 1.9 | 2.4 |
| 15 | 0.6 | 0.4 | 0.0006 | 3.0 | " | 1.4 | 2.0 | 2.1 | 2.4 | 2.6 | 5.5 |
| 16 | 0.5 | 0.5 | 0.0005 | 2.5 | " | 1.8 | 2.1 | 4.3 | 2.3 | 2.9 | 6.5 |
| 17 | 0.4 | 0.6 | 0.0004 | 2.0 | " | 1.9 | 2.5 | 2.4 | 4.4 | 3.3 | 7.0 |
| 18 | 0.3 | 0.7 | 0.0003 | 1.5 | " | 2.4 | 3.0 | 2.5 | 5.0 | 4.8 | 9.3 |
| 19 | 0.2 | 0.8 | 0.0002 | 1.0 | " | 2.9 | 3.2 | 5.0 | 7.8 | 5.5 | 11.8 |

*Resin and surfactant are the same as those of Table 1.
*Talc A to calcium carbonate have almost the same sizes as that of talc of Table 1.
*Talc B and Silica B: have size in the range of 1–40 μ, 90%
*Feed time for talc B and silica B is 30 minutes in stead of 20 minutes in cases of other materials of Table 2. In this case the thickness attained is about 1.5 times because feeding amount of solution is same with that in Example 1 i.e. 0.5 Kg/min.

EXAMPLE 3

(Confirmation of void formation by way of fine power addition)

In this Example, it is proved that the capsule of the present invention has voids formed inside it.

The sample prepared in Example 1 is cut by means of a knife, followed by putting it into water, dissolving urea contained therein and air-drying. Tetrachloroethylene and ethyl alcohol, cooled to 5° C., are mixed in various proportions to prepare a series of solutions having specific gravities of 0.92–1.6 g/cc. The respective cut pieces of capsules are fed therein to measure the

EXAMPLE 4

In this example improvement of effectiveness for the temperature dependency of dissolution-out rate is illustrated by subjecting prepared samples to dissolution-out test in water.

Each sample weighing 10 g is introduced in 200 ml of water and after definite periods of time while maintaining at a definite temperature, the component dissolved-out into water is analysed according to a conventional method and found dissolution-out ratio. The dissolving solution is renewed in each analysis and analysis is continued to find out dissolution-out ratio relative to the elapse of time and curves for these dissolution-out rate.

FIG. 3 is curves of dissolution-out rate at different temperatures measured for sample of run No. 1 of specific Example 1. FIG. 4 shows the days required till 80% by weight dissolution-out is attained, relative to variation of temperature. It can be seen that increase of temperature by 10° C. increases dissolution-out velocity by about 2.5 times. This relation will be referred to simply by $Q_{10}=2.5$. Thus $Q_{10}$ of each sample is measured and shown in Table 4. The effectiveness of the present invention is clearly seen from the fact shown in Table 4 wherein with the increase of ratio of addition of talc, the influence of temperature becomes less.

Same testing is carried out with regard to the samples prepared according to the method of Example 2 and it is confirmed that the influence of temperature can be controlled in case where any of fine powders is used as in case of Example 1.

TABLE 4

| No. | Talc ratio (x) | $Q_{10}$ | Days of dissolution-out till 80% in water at 25° C. |
|---|---|---|---|
| 1 | 0 | 2.55 | 180 |
| 2 | 0.1 | 2.54 | 170 |
| 3 | 0.2 | 2.55 | 155 |
| 4 | 0.3 | 2.50 | 140 |
| 5 | 0.4 | 2.32 | 115 |
| 6 | 0.5 | 2.15 | 106 |
| 7 | 0.6 | 1.96 | 83 |
| 8 | 0.7 | 1.90 | 69 |
| 9 | 0.8 | 1.04 | 47 |
| 10 | 0.9 | 1.80 | 11 |

$x = \frac{talc}{resin + talc}$ (by weight)

EXAMPLE 5

Example of application of the fertilizer of the present invention

Urea coated with a coating agent of resin consisting of 40% by weight of polyethylene and 60% by weight of talc according to a method of Example 1 is prepared and percentage of dissolution-out in water is measured whereby days of 80% dissolution-out at 25° C is 188 days and $Q_{10}=2.09$. This shows the same extent of dissolution-out at 25° C. with that of run No. 1 sample but temperature dependency is improved as shown in Table 5.

TABLE 5

| Samples | Days of 80% dissolution-out | | | | |
|---|---|---|---|---|---|
| | 5° C. | 15° C. | 25° C. | 35° C. | 45° C. |
| Run No. 1 sample of Example 1 | 1170 | 459 | 180 | 71 | 28 |
| Sample of this Example 5 | 821 | 391 | 188 | 90 | 43 |

In the coating method used in the production of the present invention, coated granular fertilizer having various kinds of dissolution-out rate can be obtained not only by the selection of resin itself having various moisture absorption property but also by the variation of addition of fine powder. Thus by the selection of the above-mentioned factors and a combination thereof, coated granular fertilizers having desired durability and temperature dependency can be obtained.

What is claimed is:

1. A coated granular fertilizer in which the influence of percentage of dissolution-out of the fertilizer component is controllable as a function of temperature; said fertilizer comprising solid fertilizer particles having a coating of controlled moisture permeability; said coating consisting essentially of:
   (A) 20–60% by weight, based on the total weight of the coating, of a resinous material, and
   (B) 40–80% by weight of finely divided, water-insoluble inorganic powder which is selected from the group consisting of talc, silica, calcium carbonate, diatomaceous earth, clay, $Al_2O_3$, MgO, CaO, and $Fe_2O_3$, said powder being uniformly distributed in said resinous material and having a particle size of $0.01\mu \sim 40\mu$; said resinous material (A) comprising at least 50% by weight based on the total amount of resinous material of a first component (M) selected from the group consisting of polyethylene, polypropylene, ethylene-propylene copolymer, ethylenevinyl acetate copolymer, polyvinylidene and vinylidene chloridevinyl chloride copolymer and a second component (N) selected from the group consisting of polystyrene and various waxes in an amount of from 0 to 50% by weight of the resinous material, said coating being formed by spraying a hot solution of said coating in a solvent onto said solid fertilizer particles, said solution of coating in solvent being characterized by being in a liquid state while hot but turning into a gel when cooled; and drying the coating instantaneously on the spot with hot air.

* * * * *